US 6,587,819 B1

(12) United States Patent
Lu

(10) Patent No.: US 6,587,819 B1
(45) Date of Patent: Jul. 1, 2003

(54) CHINESE CHARACTER CONVERSION APPARATUS USING SYNTAX INFORMATION

(75) Inventor: Kuei-Chih Lu, Taipei Hsien (TW)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,517

(22) Filed: Apr. 14, 2000

(30) Foreign Application Priority Data

Apr. 15, 1999 (JP) .......................................... 11-107806

(51) Int. Cl.[7] .............................................. G10L 15/18
(52) U.S. Cl. ........................ 704/257; 704/258; 704/231; 704/270; 704/8; 704/9; 704/3; 707/535; 707/536
(58) Field of Search ................................. 704/235, 260, 704/231, 251, 270, 275, 1, 7, 9, 8, 3, 249, 257, 258, 277; 707/535, 530, 541, 531, 536

(56) References Cited

U.S. PATENT DOCUMENTS

| 4,777,600 A | * | 10/1988 | Saito et al. .................. 707/535 |
| 6,014,615 A | * | 1/2000 | Chen ............................... 704/3 |
| 6,073,146 A | * | 6/2000 | Chen ........................... 707/535 |
| 6,163,767 A | * | 12/2000 | Tang et al. .................. 704/231 |
| 6,327,560 B1 | * | 12/2001 | Lin ............................... 704/8 |

FOREIGN PATENT DOCUMENTS

JP 63140365 6/1988

OTHER PUBLICATIONS

English Language abstract of JP–63–140362.
R.O.C. Patent Publication No. 089476 with an English Language translation.

\* cited by examiner

*Primary Examiner*—Vijay Chawan
(74) *Attorney, Agent, or Firm*—Green & Bernstein, P.L.C.

(57) ABSTRACT

The invention provides a Chinese character conversion apparatus using syntax information to obtain a high correct conversion rate by utilizing the speech part attribute of Chinese words. The apparatus cuts out a syllable from an input phonogram string, and searches a dictionary using the cut out syllable string to detect a Chinese word corresponding to the syllable. Then the apparatus detects a compound character corresponding to the syllable, selects homonymic character or word which are able to be connected to the detected compound character according to a speech part attribute of the compound character before or after the compound character, and combines the compound character with the selected word or character to generate an extended word. The apparatus using the detected word in the dictionary for Chinese character conversion prior to the extended word generated.

1 Claim, 6 Drawing Sheets

*Fig. 4*

| READING | COMPOUND CHARACTER | SPEECH PART ATTRIBUTE |
|---|---|---|
| De · | 的 | AN |
| huei \ | 會 | AV |
| hen V | 很 | AJ, AA |
| tai \ | 太 | AJ, AA |
| suoe V | 所 | AV |
| guo \ | 過 | BV |
| jiau \ | 較 | AJ, AA |
| je · | 著 | BV |
| le · | 了 | BV |
| neng / | 能 | AV |
| jen | 真 | AJ, AA |
| · | · | · |
| · | · | · |
| · | · | · |
| · | · | · |

*Fig. 5*

| READING | WORD | ATTRIBUTE |
|---------|------|-----------|
| ⋮ | ⋮ | ⋮ |
| bau ban\ | 包辦 | V |
| ⋮ | ⋮ | ⋮ |
| bauVben3V | 版本 | N |
| ⋮ | ⋮ | ⋮ |
| meiVli\ | 美麗 | A |
| ⋮ | ⋮ | ⋮ |
| fan\ | 犯 | V |
| fan\ | 飯 | N |
| ⋮ | ⋮ | ⋮ |
| li\ | 力 | N |
| li\ | 立 | V |
| li\ | 利 | A |
| ⋮ | ⋮ | ⋮ |
| juV | 主 | N |
| juV | 煮 | V |
| ⋮ | ⋮ | ⋮ |
| cc／ | 遲 | A |
| cc／ | 池 | N |
| cc／ | 持 | V |
| ⋮ | ⋮ | ⋮ |

CHINESE CHARACTER CONVERSION APPARATUS USING SYNTAX INFORMATION

BACKGROUND OF THE INVENTION

1. Field of the Invention

The present invention relates to an art of Chinese character conversion, and more particularly to a Chinese character conversion apparatus using syntax information which converts a phonogram string into a Chinese character by utilizing attribute information related to part of speech of a word.

2. Description of the Related Art

Ten thousand Chinese characters or more are used for documents written in Chinese. In the computer processing of the Chinese language which includes a Chinese word processor, the most important problem is that Chinese characters are input or converted accurately at a high speed by a document creator and the like. Examples of conventional means for inputting intended Chinese characters into a conversion apparatus include speech recognition, character recognition, a keyboard and the like. Since the input by means of the keyboard is the most reliable, the keyboard has been widely put into practical use.

A method for inputting Chinese characters using the keyboard is divided into two methods. One is a method using a reading (pronunciation) of Chinese characters and the other is a method using a shape of Chinese characters. In the input method using the shape, the input rules should be previously registered, and also it takes a considerably much time to register the input rules. Furthermore, it takes a long time to become accustomed to operate for users. On the other hand, the input method using the reading of the Chinese characters has widely been employed also in a Japanese word processor. The method is natural and easy to learn operation. Therefore, it is supposed that the reading input method would be the mainstream of the Chinese character input method in the future. The present invention relates to a Chinese character conversion apparatus which employs the reading input method.

For example, Taiwanese Patent Publication No. 089476 has disclosed a Chinese character conversion apparatus using a reading input method according to the prior art. FIG. 6 is a diagram showing the structure of this Chinese character conversion apparatus.

In FIG. 6, an input section 100 inputs phonograms such as a pinyin, a zhuyin, Roman letters and the like which are intended to be converted into Chinese characters by the creator of Chinese document. The input section 100 can input any length (the number of phonograms) of characters.

A word dictionary 180 stores phonogram strings and words to be converted corresponding to the phonograms. An NCHAR register 140 stores the number of syllables of the input phonogram string.

A PTR register 120 and a NP register 130 is used when the phonogram strings are converted into words, respectively. The PTR register 120 stores a position in the input phonogram string from which the conversion into a Chinese character starts. The NP register 130 stores a conversion word length on the conversion of the input phonogram string into a word, that is, the number of Chinese characters or syllables which constitute the word (In Chinese, one Chinese character has one syllable in principle.).

A comparator 150 controls a conversion controller such that by decreasing the value of the NP register 130 by one after the completion of conversion processing of a word having a certain length or a certain number of Chinese characters, conversion to Chinese character is performed preferentially for a word having a number which is decreased by one.

The conversion controller 160 sequentially shifts the set position of the PTR register 120 backward from the initial position of an input phonogram string, to verify whether or not there is a syllable which has been already converted into a Chinese character based on the number of Chinese characters or syllables constituting a word which is a conversion object set by the NP register 130. If the conversion has not been carried out yet and a corresponding word is registered in the dictionary 180, the controller 160 converts the word into a corresponding word in a dictionary 180.

A dictionary searching section 170 searches the dictionary 180 by using, as a key, a syllable string sent from the conversion controller 160. An output section 190 outputs the result of conversion carried out by the conversion controller 160.

In the Chinese character conversion apparatus described above, however, a correct conversion rate is about 9%. The remaining 4% of erroneous conversion includes no word registration (40.2%), the mistake of word boundary detection (8.0%), the erroneous selection of homonymic characters and words (33.9%), broken sound character and tone conversion, and the like. It is the most difficult to solve the problems of the word boundary detection and the selection of homonymic characters and words.

For this reason, it is desired to implement a Chinese character conversion apparatus using syntax information which can prevent the erroneous conversion caused by the mistake of word boundary detection and the erroneous selection of homonymic characters and words as described above. The present invention is provided to solve the problems.

The result of investigation (versatile fields, 1800000 characters in total) is shown below, which indicates a frequency in use of words in Taiwan, 1985.

TABLE 1

|  |  | word of 1 character | word of 2 chars. | word of 3 chars. | word of 4 chars. | word of 5 or more chars. | Total |
|---|---|---|---|---|---|---|---|
| Number of word uses | Quantity | 845356 | 451048 | 12274 | 5506 | 220 | 1314404 |
|  | % | 64.3 | 34.3 | 0.9 | 0.4 | 0.0 | 100.0 |
| Quantity of words | Quantity | 3751 | 22941 | 2374 | 2010 | 83 | 31159 |
|  | % | 12.0 | 73.6 | 7.6 | 6.4 | 0.2 | 100.0 |

Referring to the number of characters, words having two or more characters occupy 88%, and words having one character occupy 12%. Referring to the number of use of words (frequency in use), the words having two or more characters occupy only 35.7%, and the words having one character occupy 64.3%. Referring to the number of characters, the number of the words having two or more characters is greater than that of the words having one character. Referring to the frequency in use of the words, the number of the words having one character is greater than that of the words having two or more characters. Actually, most of dummy words of the Chinese language which have a high frequency in use (the stem of a word, the tail of a word, a postpositional particle, a constant particle, a pronoun, an ordinal number particle, an adverb, a continuation particle, a prepositional particle, a postpositional particle, an interjection) is composed of one character. Since the words having one character are included in longer words in accordance with the rule of the longest match method in the "Chinese character conversion apparatus", they cannot be converted.

For this reason, in the case where the word boundary detection is carried out, the erroneous results are frequently obtained. Moreover, the selection of homonymic characters is frequently mistaken also in accordance with the rule of the selection of the homonymic characters based on the frequency in use, or the rule where a previous word is converted with priority (there are words having the same reading which can be converted before and after).

In consideration of the above-mentioned problems, it is an object of the present invention is to provide a Chinese character conversion apparatus using syntax information which gives a speech part attribute (a noun, a verb and the like) is given to each word stored in a dictionary and verifies and modifies the selection of wrong homonymic characters and words corresponding to the retrieval of compound characters.

SUMMARY OF THE INVENTION

In order to achieve the above object, the present invention provides a Chinese character conversion apparatus using syntax information comprises a compound character dictionary, a word dictionary, a syllable cut out section, a dictionary searching section, a compound character detecting section, a speech part attribute processing section, and a conversion controller.

The compound character dictionary stores phonetic symbols of Chinese compound characters, compound characters and attribute of part of speech which can be connected to the compound characters. The compound characters and the speech part attribute correspond to the phonetic symbols.

The word dictionary stores phonetic symbols, words and attribute of part of speech. The corresponding words and the attribute of the words are arranged in the order of frequency in use of the words in case where there are a plurality of corresponding words. The words and the speech part attribute correspond to the phonetic symbols.

The syllable cut out section gives a first priority to conversion into a word having a maximum number of characters, syllables of an input phonetic character string which is not converted or a part of the syllables, and gives a second priority to conversion into syllables in the order of input. The syllable cut out section decreases successively the number of syllables to be converted based on the priority, and shifts sequentially the syllable to be converted backward to cut out a syllable to be currently converted.

The dictionary searching section searches the word dictionary to detect a Chinese word by using, as a search key, a syllable string to be converted which is cut out by the syllable cut out section.

The compound character detecting section detects a compound character and attribute of part of speech which can be connected to the compound character in a predetermined procedure when there is a syllable corresponding to the compound character in the syllable string to be converted which is cut out by the syllable cut out section.

When the corresponding compound character is detected by the compound character detecting section, the speech part attribute processing section searches the word dictionary by using the dictionary searching section with using, as a search key, a syllable before or after a corresponding compound character detected by the compound character detecting section. When a word which can be connected to the compound character based on a speech part attribute is detected, the speech part attribute processing section combines the compound character with the word to generate an extended word.

The conversion controller performs control so as to employ the word detected by the dictionary searching section in the conversion in preference to the extended word generated by the speech part attribute processing section.

According to the present invention with the above-mentioned structure, the compound character dictionary stores phonetic symbols of a Chinese compound character, compound characters and speech part attribute which can be connected to the compound character. The compound characters and speech part attribute correspond to the phonetic symbols. The phonetic symbol, the corresponding word and the speech part attribute of the word are arranged and registered in the dictionary in accordance with frequency in use thereof if there are a plurality of corresponding words. The syllable cut out section first gives priority to conversion into a word having a maximum number of characters of a syllable for an input phonetic character string which has not been converted or a part of the syllable, secondly gives priority to conversion of a previously input syllable. The syllable cut out section successively decreases the number of syllables to be converted based on the conversion with the priority, and sequentially shifts a syllable of a conversion object backward to cut out a syllable string to be converted. The dictionary searching section searches the word dictionary to detect a Chinese word by using, as a retrieval key, a syllable string to be converted which is cut out by the syllable cut out section. The compound character detecting section detects a compound character and a speech part attribute which can be connected to the compound character in a predetermined procedure if there is a syllable corresponding to the compound character in a syllable string to be converted which is cut out by the syllable cut out section. The speech part attribute processing section searches the dictionary by using the dictionary searching section with, as a retrieval key, a previous or next syllable to a corresponding compound character detected by the compound character detecting section, and combines the compound character with a word when the word can be connected to the compound character based on a speech part attribute. The conversion controller performs control such that the word retrieved by the dictionary searching section is converted into a Chinese character in preference to the extended word generated by the speech part attribute processing section.

RELATED APPLICATION

This application is based on Japanese patent application No. 11-107806, the contents of which are incorporated herein by reference.

BRIEF DESCRIPTION OF THE DRAWINGS

FIG. 4 is a conceptual view showing the data structure of a compound character dictionary according to the embodiment. Each notation means as follows AN : A noun can be connected after that;

AV : A verb can be connected after that;

AA : An adverb can be connected after that;

AJ : An adjective can be connected after that;

BN : A noun can be connected before that;

BV : A verb can be connected before that;

BA : An adverb can be connected before that;

BV : An adjective can be connected before that; . . . .

FIG. 5 is a conceptual view showing the data structure of a dictionary having attribute of part of speech recorded therein according to the embodiment, in which each homonymic character and word is arranged in the order of frequency in use.

Figure 6:
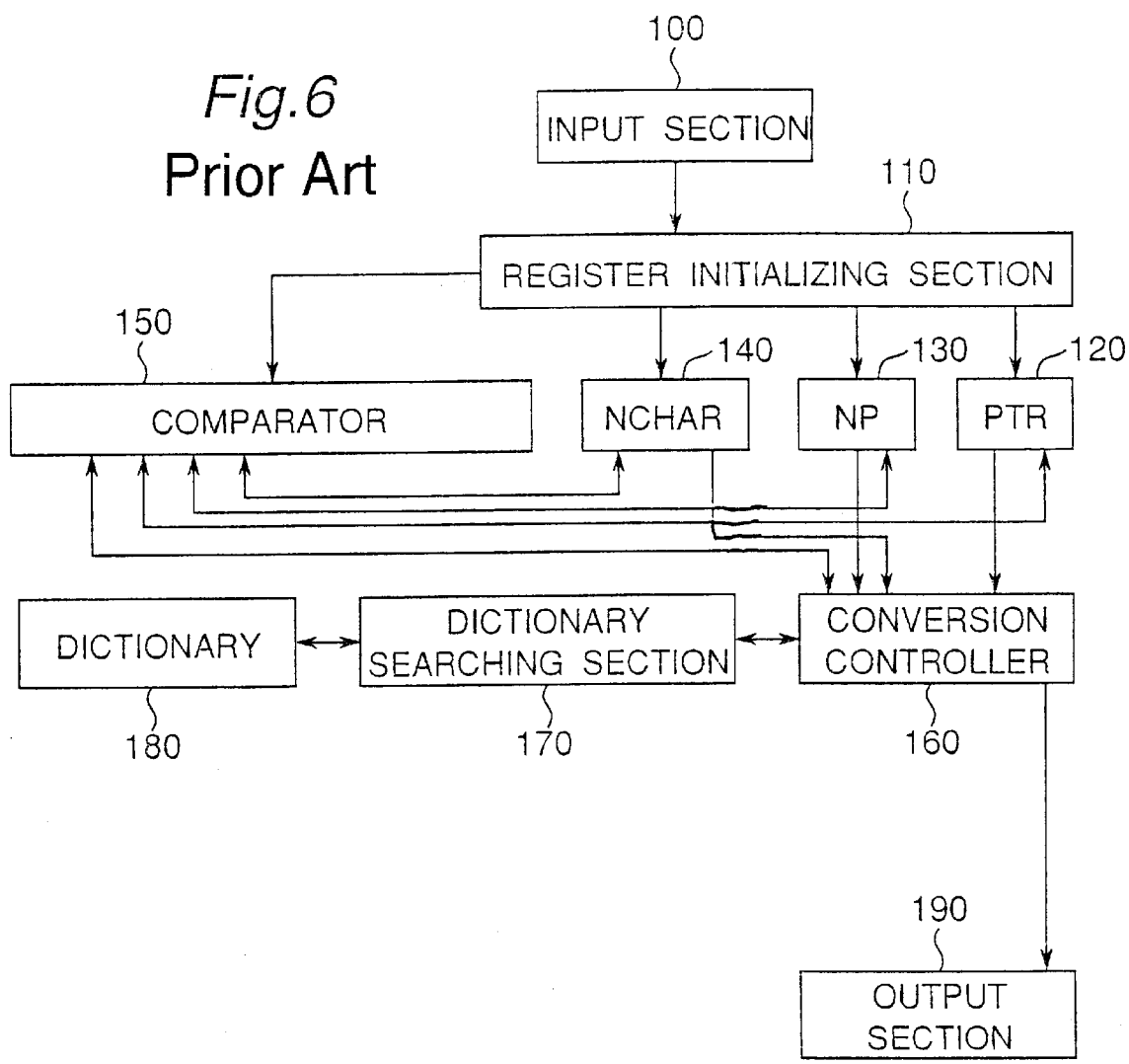

FIG. 6 is a diagram showing the structure of a Chinese character conversion apparatus according to the prior art.

DETAILED DESCRIPTION OF THE INVENTION

An embodiment of the present invention will be described below with reference to the accompanying drawings.

Figure 1:
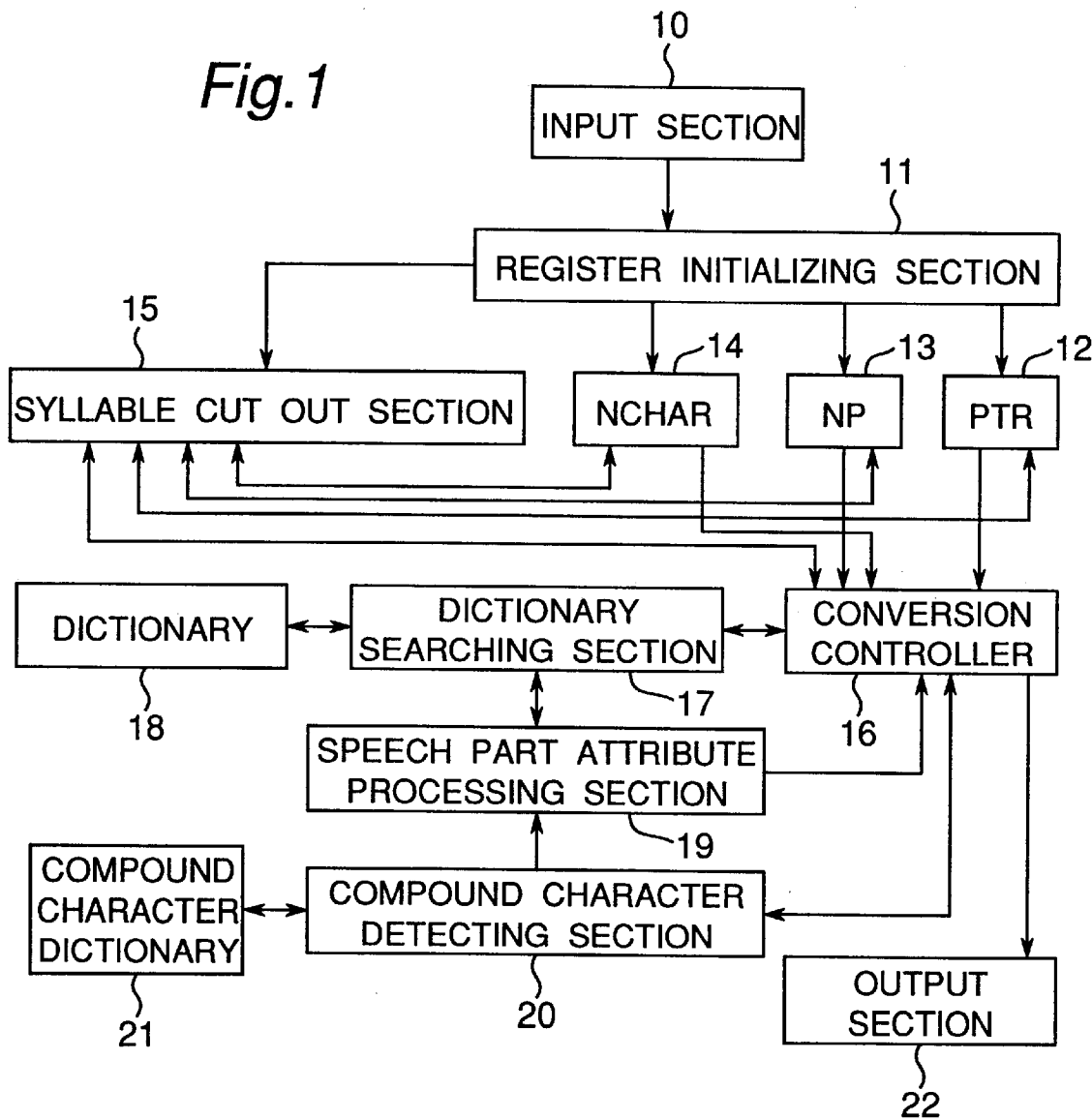
FIG. 1 is a diagram showing the structure of a Chinese character conversion apparatus according to an embodiment of the present invention.

In FIG. 1, an input section 10 inputs phonograms such as a pinyin, a zhuyin, Roman letters and the like. A word dictionary 18 has phonogram strings, Chinese words which corresponds to the phonogram strings and attribute of part of speech for the words registered therein (The conceptual view showing the data structure of the word dictionary is shown in FIG. 5). An NCHAR register 14 stores the number of syllables of the input phonogram string. In Chinese, one Chinese character corresponds to one syllable. Therefore, the number of syllables of the input phonogram string indicates the number of Chinese characters to be converted.

A PTR register 12 and a NP register 13 is used for converting a phonogram string into a word, respectively. The PTR register 12 serves to store the conversion position of the input phonogram character string from which conversion of Chinese character is started. The NP register 13 serves to store a length of a word to be converted when the input phonogram string is converted into the word, that is, to store the number of Chinese characters and syllables constituting the word. More specifically, when the contents of the above-mentioned two registers are represented by ptr and np respectively, it is indicated that np syllables which continue from a ptr-th input phonogram string are used as a search key during the retrieval of the dictionary (In the following, nchar, np, ptr and nchar described below represent the values of the NP, PTR and NCHAR registers, respectively).

Figure 2:
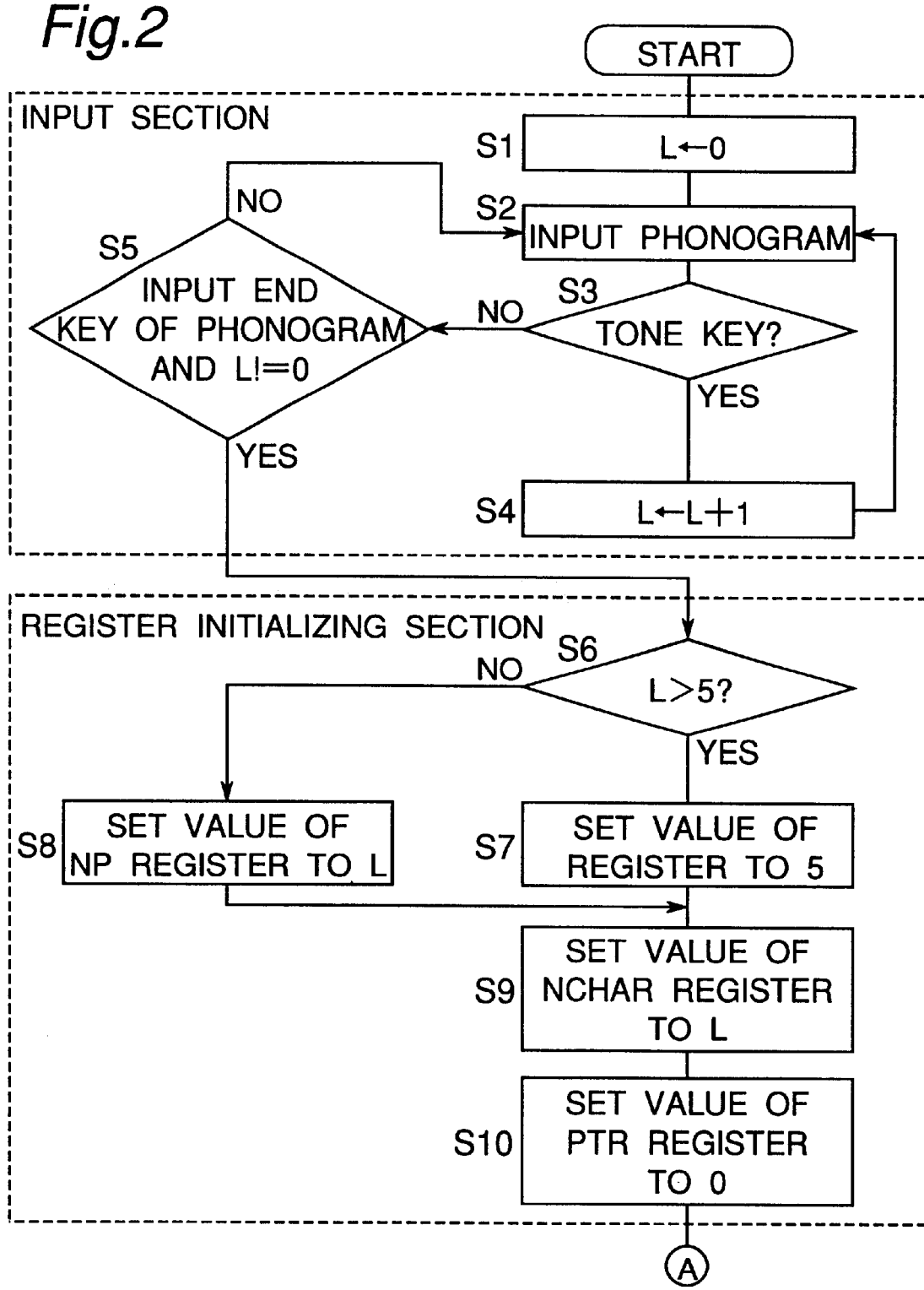
FIG. 2 is a flowchart showing the initial operation of a register according to the embodiment.

A register initializing section 11 for three registers such as the NCHAR register 14, the NP register 13, the PTR register 12 and the like. The detailed operation is shown in FIG. 2. The number (nchar) of syllables in the input phonogram string is calculated, and the value thus obtained is set to the NCHAR register 14. If the value is greater than the longest word registered in the dictionary 18, that is, the number (max) (five in the present embodiment) of Chinese characters of a word having the greatest number of Chinese characters constituting the word, the value of max is set to the NP register 13. If the value is equal to or less than 5, the number of syllables of the input phonogram string is set to the NP register 13 and the value of the PTR register 12 is set to 0.

A syllable cut out section 15 verifies whether the operation of Chinese character conversion is completed or not. When the operation is completed, the length of a word (the shortest length of the conversion is simple Chinese character conversion with length of 1) to be a conversion object which is stored in the NP register 13 is added to the value of the PTR register 12 and the value of the NP register 13 is reset to nchar-ptr. When the reset value is greater than the value of max, the value of max is set to the NP register 13.

A compound character dictionary 21 stores the reading of a special compound character, the character and an attribute of part of speech which can be connected to the compound character. A compound character detecting section 20 searches the compound character dictionary 21 by using, as a retrieval key, the ptr-th syllable of the input phonogram string.

A speech part attribute processing section 19 supplies, to a dictionary searching section 17, (np−1) syllables from a (ptr+1) th input phonogram string as a search key to retrieve the dictionary 18, when the compound character detecting section 20 detects that there is a corresponding compound character and the speech part connection to the compound character is post-connection. Then the speech part attribute processing section 19 retrieves a word corresponding to the speech part attribute which can be connected to the compound character. The speech part attribute processing section 19 combines the corresponding word with the compound character when the corresponding word is found or registered, thereby generating a word which an operator intends to originally obtain by conversion, that is, an extended word.

Figure 3:
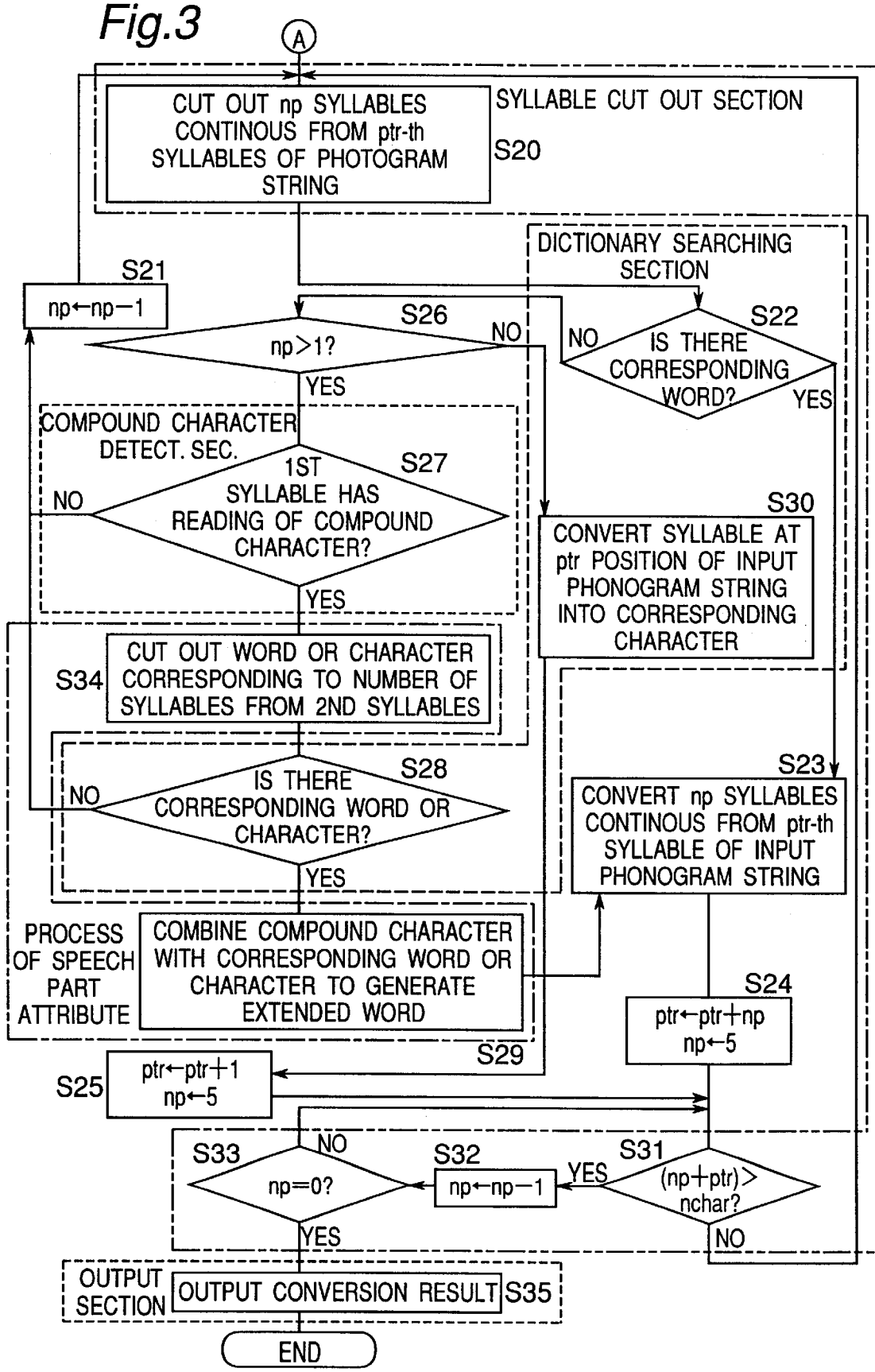
FIG. 3 is a flowchart mainly showing the operation of conversion controller according to the embodiment.

The reference numeral 16 denotes conversion controller. The detailed operation of the controller 16 is shown in FIG. 3. np syllables which continue from the ptr-th input phonogram strings are supplied as a search key to the dictionary searching section 17 to search the dictionary 18. The conversion processing is carried out according to a principle where the detected word is converted with the first priority and the word generated by the speech part attribute processing section 19 is converted with the second priority. If this syllable has already been converted, the conversion is carried out based on the values of the PTR and NP registers 12 and 13 which are reset by the syllable cut out section.

The dictionary searching section 17 fetches a corresponding word from the compound character dictionary 18 by using, as a search key, a syllable sent from the conversion controller 16 or the speech part attribute processing section, or a word having the highest possibility which is arranged on the head if there are a plurality of words. The section 17 sends the fetched word to the conversion controller 16. An output section 22 outputs the results of the conversion by the conversion controller 16.

FIG. 4 is a conceptual view showing a data structure of the compound character dictionary 21 according to the present embodiment. The dictionary 21 comprises a correspondence table of the basic reading sound or pronunciation of a compound character, a compound character corresponding thereto and a speech part attribute which can be connected to the compound character. In the present embodiment, prepositional particles of "在", "從", "將" and the like, conjunctive particles of "則", "若", "和", "以" and the like, affirmatives and negatives of "是", "不", "有" and the like and designating particles of "其", "該" and the like are regarded as compound characters in Chinese. These Chinese compound characters are coupled to words to constitute a word having more Chinese characters. A word constituted in such a combination is referred to as "an extended word" in this specification, for example, "在台北", "有--天" and the like. This dictionary 21 is used when the compound character detecting section 20 should determine whether a character corresponding to a syllable is a compound character or not.

FIG. 5 is a conceptual view showing the data structure of the dictionary 18 which records the attribute information of part of speech. Each of the characters and words of the Chinese language has an attribute such as a noun, a verb, an adjective, an adverb or the like. In the case where the compound character is detected, a word which can be connected to the compound character before and after the character is detected in accordance with the attribute definition of each part of speech recorded in the dictionary 18. The detected word is combined with the compound character to constitute an extended word. The flow of this operation will be described below.

FIG. 2 mainly shows the flow of the initializing operation of the registers of the Chinese character conversion apparatus according to an embodiment of the present invention. The operation will be described below with reference to the drawing.

(S1) First of all, a register L for calculating the number of syllables is set to zero.

(S2) A phonogram string is input.

(S3) It is verified whether a currently input phonogram is a tone key or not. If the phonogram is the tone key, the routine proceeds to (S4). Otherwise, the routine proceeds to (S5).

(S4) The value of the register L for calculating the number of syllables increments by one, and the routine returns to (S2).

(S5) It is verified whether the currently input phonogram string is an input end key or not. If the currently input phonogram string is the input end key and the number of syllables is not 0, the routine proceeds to (S6). If the currently input phonogram string is not the input end key, the routine returns to (S2).

(S6) It is verified whether the number of syllables which is currently input is greater than 5 or not. If the number of syllables is equal to or greater than 5, the routine proceeds to (S7). If the number of syllables is smaller than 5, the routine proceeds to (S8).

(S7) The value of the NP register is set to 5.

(S8) The value of the NP register is set to the number of syllables which is currently input.

(S9) The value of the NCHAR register is set to the number of syllables which is currently input.

(S10) The value of the PTR register is set to 0.

FIG. 3 mainly shows the operation of the conversion controller. The operation will be described below with reference to FIG. 3.

(S20) np syllables which continue from the ptr-th phonogram string are cut out.

(S21) The conversion length np of the phonogram string decrements by 1, and the routine returns to (S20).

(S22) It is determined whether or not a word corresponding to the cut out syllables in the (S20) is stored in the dictionary 18. If the word is stored in the dictionary 18, the routine proceeds to (S23), otherwise, the routine proceeds to (S26).

(S23) np syllables which continue from the ptr-th input phonogram string are converted into a corresponding word detected at the (S22), and the routine then proceeds to (S24).

(S24) np is added to the value of the PTR register. The value of the NP register is set to 5.

(S25) 1 is added to the value of the PTR register. The value of the NP register is set to 5.

(S26) It is verified whether the value of the NP register is currently greater than 1 or not. If the value of the NP register is equal to or greater than 1, the routine proceeds to (S27), otherwise, the routine proceeds to (S30).

(S27) It is verified whether or not a first one of the syllables cut out at the (S20) has the reading of the compound character. If the first syllable has the reading of the compound character, the routine proceeds to (S34). If not, the routine proceeds to (S21).

(S34) A word corresponding to each syllable number is cut out from a second one of the syllables cut out at the (S20).

(S28) It is verified whether there is a word corresponding to the syllables cut out at the (S34) or not. If there is the corresponding word, the routine proceeds to (S29). If not, the routine proceeds to the (S21).

(S29) The compound character detected at the (S27) is combined with the word detected at the (S28) to generate an extended word of one word. The np syllables which continue from the input syllable ptr are converted into an extended word. Then, the routine proceeds to (S23).

(S30) A syllable at the position of ptr in the input phonogram string is converted into a corresponding character, and the routine proceeds to the (S25).

(S31) The value of (ptr+np) is compared with the value of nchar. If the former is greater, the routine proceeds to (S32). If smaller, the routine proceeds to the (S20).

(S32) The conversion length np in the phonogram string decrements by 1, and the routine proceeds to (S33).

(S33) It is verified whether the value of the NP register is zero or not. If the value of the NP register is zero, the Chinese character converting processing of the input phonogram string is completed. If not so, the routine proceeds to (S31).

FIG. 4 is a conceptual view showing a data structure of the compound character dictionary 21 according to the present embodiment. This dictionary 21 comprises a table for linking the basic reading sound of a compound character to a compound character corresponding thereto and a speech part attribute which can be connected to the compound character. In the present embodiment, simple Chinese characters such as "的", "会", "很", "太", "所", "過", "較", "著", "了", "能", "真" and the like in Chinese are regarded as compound characters. According to the present invention, it is possible to select an optimum Chinese character or word candidate in accordance with the speech part attribute which can be connected to the compound character before or after. For example, young people currently use a word of "好遜" very often in Taiwan. This word is not registered usually in a dictionary. In the Chinese character conversion apparatus employing an exchange rule of "the longest match method (最長一致法)", it is possible to obtain a much higher conversion rate by the attribute of the word.

Next, an operation according to the present embodiment having the above-mentioned structure will be described by taking "ma ma · suoeV juV de · fan\" as an input example. For easy understanding the explanation, words with the most possibility for conversion which is stored in the dictionary 18 corresponding to the input string will be described below.

"ma ma · 媽媽"
"suoeV 所"
"juV 主"
"de · 的"
"fan\ 犯"

Referring to the flowchart, when the above-mentioned phonogram string is input, the register initializing section shown in FIG. 2 obtains the number of syllables by dividing the input phonogram string for each syllable in response to a tone signal. The above-mentioned input string has six syllables. The number of syllables of 6 is therefore set to the NCHAER register 14 (S9). That value is greater than the number of Chinese characters of the longest word in the dictionary 18 (five in the present embodiment) (S6). Therefore, 5 is set as the initial value to the NP register 13 (S7), and the value of the PTR register 12 is set to 0. The value ptr of the PTR register represents that the current start position for searching the dictionary 18 is at the ptr-th syllable of the input phonogram string.

After the initial values of the PTR register 12, the NP register 13 and the NCHAR register 14 are set based on the input number of syllables, the conversion controller shown in FIG. 3 first cuts out strings of "ma ma · suoeV juV de ·" of the phonogram string comprising continuous syllables from 0th to fourth syllables sent from the input section 10 depending on the values of the PTR register 12 and the NP register 13 (S20). The cut out string is supplied as a search key to the dictionary searching section 17 to search the dictionary 18 (S22). Since there is no word corresponding to the key, the compound character dictionary 21 is searched by the compound character detecting section 20. "ma" is decided not to be the reading of the compound character. Then 0th to 3rd syllables of "ma ma · suoeV juV" are cut out to decrease the value of the NP register 13 by 1. Next, this syllable string is set as a search key to the dictionary searching section 17 to search the dictionary 18 (S22). Since there is no corresponding word, the compound character dictionary is searched by the compound character searching section to decide that "ma" is not the reading of the compound character.

By repeating the above-mentioned steps, the syllable string which continues from the input phonogram string is sequentially cut out, and the value of the NP resister 13 is decreased in order. When the value of the NP register 13 is 2, the continuous syllable string of "ma ma ·" is cut out.

By using the syllable string of "ma ma ·" as a search key, the dictionary searching section 17 searches the dictionary 18 (S22). Since a corresponding word of "媽媽" is stored in the dictionary 18, "ma ma ·" is converted into "媽媽" based on the conversion principle of "the longest match method". In this case, the value of the PTR register 12 is added to 2, and the value of the NP register 13 is set to the most possible word length of 5. In this case, the value of the NP register 13 of 5 is added to the value of the PTR register 12 to obtain a value of 7. At this time, 7 is greater than the number of syllables of the NCHAR register of 6. The value of the NP register 13 is therefore set to the length of word with the most possibility to be converted as 4.

Then, the second to fifth continuous syllables are cut out from strings sent from the input section 10 to obtain strings of "suoeV juV de · fan\" (S20). The syllable strings are supplied as a search key to the dictionary searching section 17 to search the dictionary 18 (S22). Since there is no corresponding word in the dictionary, it is verified whether a first syllable of "suoeV" is the reading of a compound character or not (S27). The compound character dictionary has a word of "所" corresponding to the reading of "suoeV". The attribute of part of speech capable of being connected to "所" registered in the compound character dictionary 21 is a verb attribute.

Subsequently, the continuous syllable strings of "juV de · fan\", "juV de ·" and "juV" are cut out sequentially (S34). Referring to the cut out syllable, a corresponding word is searched or detected in the dictionary 18 (S28). Since a character of "煮" having a corresponding verb attribute is registered, an extended word of "所煮" is generated by combining a compound character of "所" with the corresponding character of "煮" (S29). Then the "suoev juV" is converted into the extended word of "所煮" (S23).

Next, the length of the extended word of 2 is added to the value of the PTR register 12 to obtain 4. The value of the NP register 13 is set to the most possible word length of 5. In this case, the value of the NP register of 5 is added to the value of the PTR register 12 of 4 to obtain 9. At this time, 9 is greater than the number of syllables of the NCHAR register of 6. The value of the NP register 13 is therefore set to the most possible conversion word length of 2.

Then, the fourth and fifth continuous syllable string is cut out from a string sent from the input section 10 to obtain a string of "de · fan\" (S20). The syllable string is then supplied as a search key to the dictionary searching section 17 to search the dictionary 18 (S22). Since there is no corresponding word in the dictionary 18, it is verified whether a first syllable of "de ·" is the reading of a compound character or not (S27). The compound character dictionary 21 has a word of "的" corresponding to the reading of "de ·" therein. The speech part attribute capable of being connected to "的" registered in the compound character dictionary 21 is noun attribute.

Next, a final reading of "fan\" is cut out (S34). Referring to the cut out syllable of "fan\", a corresponding registered word is detected in the dictionary 18 (S28). Since a character of "飯" having a noun attribute coping with "的" is registered, an extended word of "的飯" is generated by combining a compound character of "的" with the corresponding character of "飯" (S29). The "de · fan\" is therefore converted into the extended word of "的飯" (S23).

Next, the length of the extended word of 2 is added to the value of the PTR register 12 to obtain 6 (S24). 6 is equal to the number of syllables of the NCHAR register of 6, and then the new syllable cannot be cut out. The conversion controller decides that the Chinese character converting process of the input phonogram string has been completed (S32), and then sends the result of the conversion of "媽媽所煮的飯" to the output section 22.

While the present invention has been described based on the embodiment, it is a matter of course that the present invention is not restricted to the above-mentioned embodiment. For example:

① The compound character is not limited to a first syllable in cut out syllables but any of the cut out syllables may be used;

② In the search, it is not only determined whether a word after a compound character can be connected to the compound character, but it is also possible to determine whether a word before the compound character can be connected to the compound character. Therefore, the range of the search can be enlarged to obtain much greater conversion efficiency.

③ The phonogram is not restricted to the illustrated phoneme characters and syllable characters but includes phoneme symbols. Furthermore, it is also possible to use characters such as kana characters in Japanese, the Hankul alphabet of the Korean when they are objects for Chinese character conversion.

④ As a matter of course, application of the invention includes a word processor for classical Chinese writing in Japanese, and the like.

⑤ A learning function and the like can also be added.

According to the present invention, in conversion of the input syllable string to Chinese characters, if a compound character (which has characteristics such as a prepositional particle, a conjunctive particle, an affirmative, a negative, a demonstrative pronouns and the like in Chinese on a syllable to be converted) has reading thereof in the dictionary 18, and there is, in the dictionary 18, a homonymic character or word having a speech part attribute which can be connected to the compound character at syllable continuously before or after the compound character, then the optimum homonymic character or word is automatically selected and the compound character is combined with the selected word to generate an extended word. The device for converting a Chinese character using such a syntax information can easily eliminate erroneous conversion caused by the homonymic characters and words. Consequently, accuracy can be enhanced for the conversion of Chinese characters in the creation of Chinese documents, and a very great technical effect is achieved.

Although the present invention has been described in connection with specified embodiments thereof, many other modifications, corrections and applications are apparent to those skilled in the art. Therefore, the present invention is not limited by the disclosure provided herein but limited only to the scope of the appended claims.

What is claimed is:

1. A Chinese character conversion apparatus that converts an input phonetic character string into Chinese characters using syntax information, comprising:

a compound character dictionary that stores phonetic symbols of Chinese compound characters, the compound characters and speech part attributes which can be connected to the compound characters, wherein the compound characters and the speech part attributes correspond to the phonetic symbols;

a word dictionary that stores phonetic symbols, words and speech part attributes, wherein, when there are a plurality of words corresponding to the phonetic symbols, the phonetic symbols with the corresponding words and the attribute of the words are arranged in the order of frequency of use of the words, and the words and the speech part attributes correspond to the phonetic symbols;

a syllable cut out section that cuts out syllables to be currently converted, gives a first priority to conversion of at least a part of the syllables of an input phonetic character string which is not converted into a word having a maximum number of characters, and gives a second priority to conversion of the syllables in the input order, the syllable cut out section successively decreasing the number of the syllables to be converted based on the priority and sequentially shifting the syllables to be converted backward;

a dictionary searcher that searches the word dictionary to detect a Chinese word using, as a search key, a syllable string to be converted which is cut out by the syllable cut out section;

a compound character detector that detects a compound character and speech part attribute which is connectable to the compound character in a predetermined procedure when there is a syllable corresponding to the compound character in the syllable string to be converted which is cut out by the syllable cut out section;

a speech part attribute processor that searches the word dictionary through the dictionary searcher by using, as a search key, a syllable before or after a corresponding compound character detected by the compound character detector when the corresponding compound character is detected by the compound character detector, and when a word which is connectable to the compound character based on a speech part attribute is detected, combines the compound character with the word to generate an extended word; and a conversion controller that controls the conversion into Chinese characters so as to employ the word detected by the dictionary searcher in the conversion in preference to the extended word generated by the speech part attribute processor.

* * * * *